[54] SIGNAL-SELECTING RADIO RECEIVER

[75] Inventor: George H. Fathauer, Decatur, Ill.

[73] Assignee: Masco Corporation, Taylor, Mich.

[22] Filed: Oct. 1, 1971

[21] Appl. No.: 185,585

[52] U.S. Cl. ..................325/469, 325/301, 325/453, 325/464, 325/468

[51] Int. Cl. ..............................................H04b 1/32

[58] Field of Search......325/452, 453, 464, 468, 469, 325/470, 301-304, 306, 366; 343/200; 179/15 BT, 15 AS

[56] References Cited

UNITED STATES PATENTS

| | | | |
|---|---|---|---|
| 3,482,166 | 12/1969 | Gleason | 325/468 |
| 3,531,724 | 9/1970 | Fathauer | 325/469 |

*Primary Examiner*—Robert L. Griffin
*Assistant Examiner*—Marc E. Bookbinder
*Attorney*—Harold B. Hood et al.

[57] ABSTRACT

The invention is a signal-selecting radio receiver which includes first converter means for tuning to a continuously occurring radio frequency signal, and second converter means for automatically, sequentially tuning to a plurality of discrete, preselected frequencies different from that of the continuously occurring radio frequency signal. The first and second tuner means operate simultaneously and the second tuner means includes circuitry for automatically switching the receiver from one of the discrete frequencies to another in sequence until a signal is received. There is also provided circuitry which disables the second tuner in the absence of a signal on any of the discrete frequencies and for disabling the first tuner means and locking the second tuner means in condition to receive one of the discrete frequencies upon reception of a signal on that frequency.

30 Claims, 4 Drawing Figures

INVENTOR:
GEORGE
H. FATHAUER
BY, Hood, Gust, Irish, Lundy & Coffey
ATTORNEYS

INVENTOR:
GEORGE H. FATHAUER
BY, Hood, Gust, Irish, Lundy & Coffey
ATTORNEYS

INVENTOR:
GEORGE H. FATHAUER
BY, Hood, Gust, Irish Lundy & Coffey
ATTORNEYS

SIGNAL-SELECTING RADIO RECEIVER

BACKGROUND OF THE INVENTION

1. FIELD OF THE INVENTION

The present invention relates to a signal-selecting radio receiver and more particularly to such a receiver which will automatically, sequentially tune to a plurality of discrete, preselected frequencies and which will stop automatically upon reception of a signal on one of the frequencies, and which tunes to a continuously occurring radio frequency signal different from each of the discrete frequencies in the absence of a signal on any of them.

2. DESCRIPTION OF THE PRIOR ART

Signal-seeking radio receivers which automatically, sequentially tune to a plurality of discrete radio frequencies and which lock onto one of the frequencies upon reception of a signal at that frequency are known. Such a receiver is disclosed in U.S. Pat. No. 3,531,724 issued Sept. 29, 1970 to the present inventor. This receiver incorporates electronic circuitry for automatically switching the receiver from one to another of a plurality of discrete frequencies in sequence until a signal is received on one of them. When the signal is received, the receiver "locks" onto that frequency. Upon termination of the signal, the receiver continues its sequential scanning until another signal or carrier appears on one of the frequencies.

Another such receiver is disclosed in U.S. Pat. No. 3,470,481 issued Sept. 30, 1969 to R. T. Meyers et al. This receiver again includes circuitry for automatically monitoring a plurality of channels and locking the receiver onto one of the channels in response to reception of a signal.

Another such receiver is disclosed in the U.S. Pat. No. 3,497,813 to T. Gallagher, this receiver further including circuitry for periodically sampling or testing a priority channel to determine if a signal is being received thereon when the receiver is locked on a different frequency.

However, each of these prior art receivers is only capable of tuning to a single radio frequency at any one time, and, due to the intermittent nature of the signals being broadcast at the discrete frequencies, a considerable amount of "dead time" is encountered during those periods when no signal is being received. While this "dead time" may be of little consequence when the receiver is being used for strictly business purposes, it does seriously detract from the suitability of the receiver for use as an entertainment device.

It is therefore an object of this invention to provide a signal-selecting radio receiver which simultaneously tunes to a plurality of radio frequencies and automatically selects one of the signals being received for reproduction.

It is another object of this invention to provide a signal-selecting receiver which automatically, sequentially scans a plurality of discrete radio frequencies, and simultaneously therewith, tunes continuously to a selected frequency within a band of radio frequencies.

It is yet another object of the invention to provide a signal-selecting receiver having novel switching circuitry responsive to the reception of an intermittently occurring radio frequency signal for locking the receiver in condition to demodulate the intermittently occurring signal and for disabling that portion of the receiver which is tuned to receive a continuously occurring radio frequency signal.

It is still another object of the invention to provide such a receiver wherein all of the switching is accomplished electronically.

Other objects will become apparent as the description proceeds.

SUMMARY OF THE INVENTION

The present invention relates to a signal-selecting radio receiver for automatically, selectively tuning to individual ones of a plurality of predetermined, intermittently occurring radio frequency signals and, simultaneously therewith, tuning to a continuously occurring radio frequency signal different from the intermittently occurring signals, the receiver automatically, selectively reproducing one of the signals. The receiver comprises a first converter continuously tunable over a predetermined frequency band for conditioning the receiver to demodulate a selected continuously occurring radio frequency signal, and second converter means for automatically, sequentially conditioning the receiver to demodulate individual ones of a plurality of discrete, intermittently occurring radio frequency signals. There is provided circuitry for generating a first control signal in response to reception of one of the discrete radio frequency signals and generating a second control signal in response to the absence thereof. The first converter is coupled to the control signal-generating circuitry and is disabled in response to the first control signal. The second converter means includes circuitry for locking the second converter in condition to demodulate one of the discrete radio frequency signals upon reception thereof, and further includes an output circuit which is coupled to the control signal-generating circuitry which is disabled in response to the second control signal. An audio amplifier is provided and includes an input circuit which is coupled via intermediate circuitry to the first converter and the second converter means.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings, wherein.

DESCRIPTION OF THE PREFERRED EMBODIMENT

Figure 1:
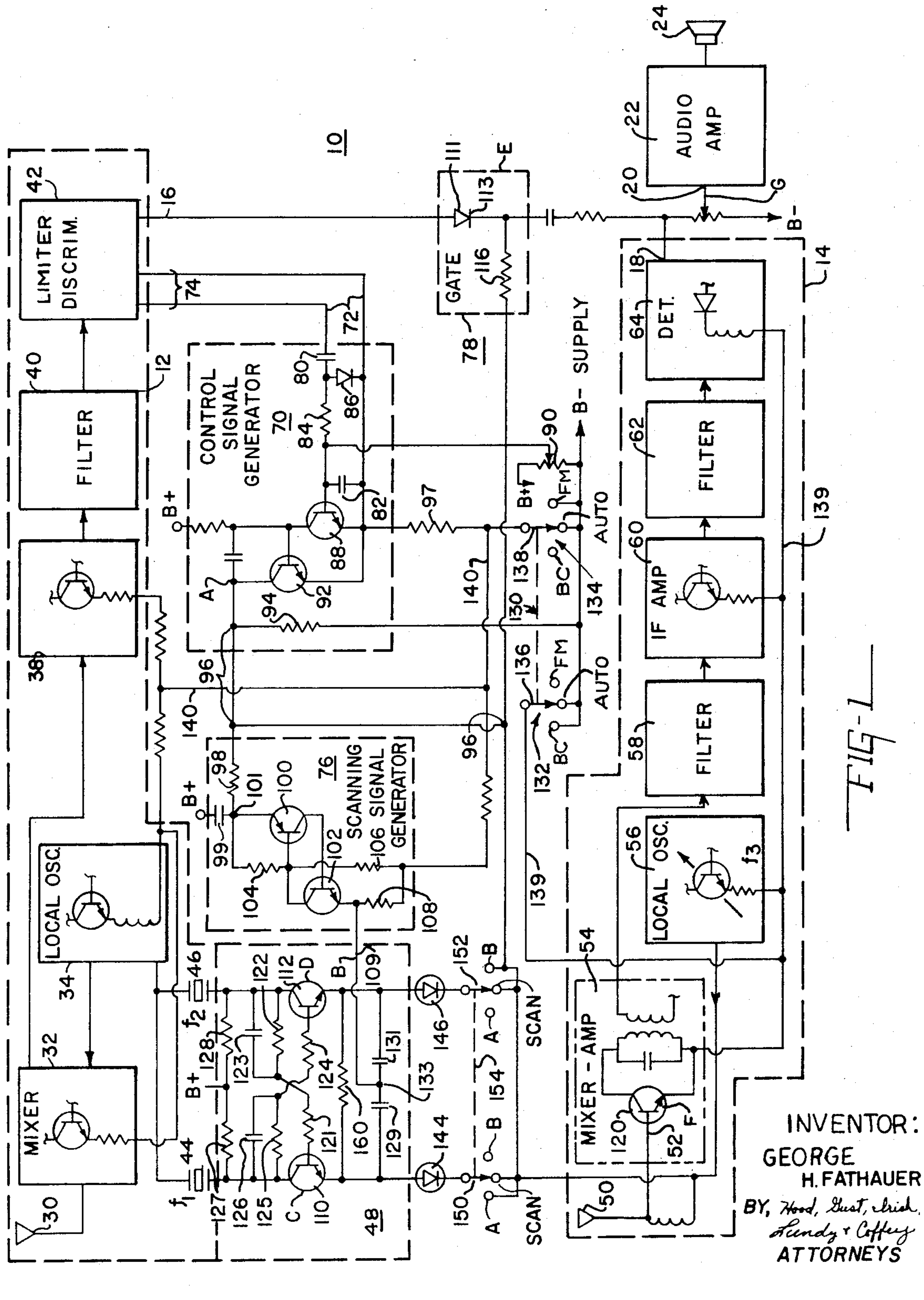
FIG. 1 is a schematic diagram of a signal-selecting radio receiver in accordance with the invention with portions of the circuit shown in block diagram.

Referring first to FIG. 1 there is illustrated a signal-selecting radio receiver 10 which comprises a first radio frequency converter 12 (in the dashed line block)

and a second radio frequency converter 14 (within dashed line) having output circuits 16 and 18, respectively, connected to the input circuit 20 of an audio amplifier 22 provided with a speaker 24.

First converter 12 includes a receiving antenna 30, a mixer 32 wherein a received signal is heterodyned with a local oscillator signal from a local oscillator 34, intermediate frequency (IF) amplifier 38, filter 40 and a limiter-discriminator circuit 42. Elements 30 through 42 comprise a conventional frequency modulation (FM) demodulator circuit or converter and any of the well known FM converter circuits could be substituted therefor without departing from the spirit or scope of the invention.

Local oscillator 34 has connected thereto a plurality of frequency-determining elements 44 and 46, such as crystals, which are individually, repetitively sequentially energized or activated by means of a suitable switching circuit 48, the frequency of the local oscillator signal generated by local oscillator 34 being determined by the particular one of the crystals 44, 46 which is energized. By reason of this circuitry, converter 12 is sequentially tuned to receive different ones of a plurality of discrete, radio frequency signals. For convenience, these signals are hereinafter identified as $f_1$, and $f_2$. Typically, the signals transmitted at each of the discrete frequencies will be of the intermittently occurring type. That is, the transmissions at those frequencies occur for a limited time and at random intervals, such signals being typical of police, emergency, and aircraft communications. Upon the reception of a signal at one of the discrete frequencies, there is provided circuitry, to be explained in more detail below, which automatically terminates the repetitive, sequential switching of switching circuit 48 thereby causing the receiver to "lock" onto the particular frequency for the duration of the transmission.

A more detailed discussion of this type of receiver is contained in the aforementioned patents to Fathauer and Meyers et al. and further explanation herein is not required.

The second converter 14 includes a receiving antenna 50 connected to the input circuit 52 of a mixer circuit 54 wherein signals received by antenna 50 are heterodyned with local oscillator signals from a continuously tunable, manually adjustable local oscillator 56. The signal subsequently passes through a filter 58, IF amplifier 60, a second filter 62, and a detector circuit 64. Elements 50 through 64 comprise a conventional amplitude modulated radio frequency signal converter or demodulator with amplitude modulated signals received on antenna 50 being demodulated therein, the demodulated signal appearing at output terminal 18 thereof. Tuning of the converter 14 to condition it to demodulate a signal at a particular radio frequency, hereinafter identified as $f_3$, is effected by manual adjustment of a tuning circuit contained within local oscillator 56 in well known manner. Such converters are well known in the prior art and further description again is not required.

To combine operatively the two converters there is provided a novel control circuit which includes a control signal generator 70 (in the dashed line block) which has an input circuit 72 coupled to auxiliary output circuit terminals 74 of limiter-discriminator circuit 42. There is also a scanning-signal generator 76 (in dashed lines) and a gate circuit 78. The limiter-discriminator 42 produces an amplified intermediate frequency (IF) signal voltage in response to the reception of a signal by the converter 12. This signal is rectified and filtered by capacitors 80, 82, resistor 84, and diode 86 and applied as a negative unidirectional (DC) voltage to the base of control transistor 88. In the absence of the IF signal, control transistor 88 is normally biased to a conductive or "on" condition by means of a voltage determined by adjustment of squelch control 90. Upon reception of a signal, the aforementioned negative voltage is applied to the base of control transistor 88 biasing same to an "off" condition. It is now apparent that the magnitude of the IF signal required to bias control transistor 88 to an "off" condition is determined by the magnitude of the voltage applied thereto via squelch control 90 connected to the negative side of the B supply. Thus, squelch control 90 provides a means for adjustably establishing the strength of the IF signal required to switch control transistor 88 from an "on" to an "off" condition.

Connected in cascade to control transistor 88 is a second control transistor 92 which is biased "off" or non-conducting whenever control transistor 88 is "on" and conversely, is biased "on" or conducting when control transistor 88 is biased "off." Thus, when there is no IF signal at terminals 74 by reason of the absence of a received signal, control transistor 92 is in a non-conducting state, and, conversely, when an IF signal is generated by reason of the reception of a signal, control transistor 92 is biased "on." Coupled in parallel with control transistor 92 is a resistor 94 which is bypassed by control transistor 92 when the latter is conducting. As will be explained in more detail below, one of transistors 110, 112 of switching circuit 48 is always in a conductive condition, The B+ potential which is applied to the collectors of transistors 110, 112 is always applied to the output terminal 96 of control signal generator 70 through the corresponding light emitting diodes (LED's) 144, 146 which provide a resistance path for supplying the B+ potential required for operation of transistor 92. Thus the voltage appearing at the collector of control transistor 92 will be high or low in accordance with whether control transistor 92 is non-conductive or conductive, respectively. This voltage is identified as wave form A in FIG. 3 with the high level and low level signals being indicated as *a* and *b* respectively, these signals functioning as first and second control signals to control the signal-selecting functions of the circuits as explained below.

Connected to the output terminal 96 of control signal generator 70 is a scanning-signal generator 76 which includes a resistor 98, charging capacitor 99, network and oscillator transistors 100, 102 with their appropriate biasing resistors 104, 106, and 108. In response to the high level voltage signal *a* of wave form A, potential is applied to charging capacitor 99 causing the capacitor 99 to become charged. When the charge of capacitor 99 reaches a sufficient level, the voltage at terminal 101 thereof forward biases the first oscillator transistor 100 rendering it conductive; the second oscillator transistor 102 is in turn rendered conductive in response to the "on" condition of transistor 100. When transistor 102 is "on," it provides a conductive path which allows capacitor 99 to discharge. Upon discharge of capacitor 99, transistor 100 is again rendered non-conductive and capacitor 99 again begins to charge. Thus scanning-signal generator 76 is seen to be a relaxation oscillator circuit which will generate a plurality of repeating pulses *c* as shown in wave form B in FIG. 3, wave form B appearing at output terminal 109 of scanning-signal generator 76. The frequency of the pulse train is of course determined by the magnitude of capacitor 99 and resistor 98.

Conversely, when wave form A is at a low voltage level *b*, no charging voltage is applied to charging capacitor 99 whereby transistor 100 remains in a non-conductive state and the scanning-signal generator is thereby rendered inactive producing signal *d* of wave form B. Thus, by reason of its connection to the control signal generator 70, scanning-signal generator 76 will generate a series of repeating pulses *c* or a continuous low level voltage *d* at its output terminal 109 in response to the non-reception or reception, respectively, of a signal in converter 12.

Wave form B is in turn applied to the switching circuit 48 which includes switching transistors 110 and 112 which are alternately rendered conductive in response to succeeding ones of the pulses *c* of wave form B. The base of transistor 110 is coupled to the collector of transistor 112 by serially connected resistors 121, 122 and resistor 122 has a capacitor 123 connected in shunt therewith. The base of transistor 112 is similarly connected to the collector of transistor 110 by resistors 124, 125 and capacitor 126. The collectors of transistors 110, 112 are connected to the B+ supply through suitable load resistors 127 and 128, respectively. Connected in series between the emitters of transistors 110, 112 are capacitors 129 and 131 with the common connection 133 thereof being coupled to the output terminal 109 of scanning-signal generator 76. This circuit is essentially a "steered flip-flop" circuit wherein each succeeding voltage pulse applied to terminal 133 causes each of transistors 110, 112 to change its conductive state.

The switching sequence of switching transistors 110, 112 is indicated in charts C and D with the shaded areas corresponding to a conductive state of the transistor. In response to low level voltage *d*, switching of transistors 110, 112 is terminated and the particular one of switching transistors 110 or 112 which was in a conductive state at the time that a signal was detected in converter circuit 12 will remain in a conductive state. Since the particular one of the transistors 110 or 112 which was conducting functions to energize a particular one of the crystals 44 or 46, it can be seen that the one of the crystals 44 or 46 which was activated at the time a signal was detected will remain activated by reason of the termination of the switching of the transistors 110, 112. Correspondingly, converter 12 is locked in a condition to demodulate the received signal. Upon termination of the received signal, the IF signal terminates rendering transistor 92 nonconductive and scanning-signal generator 76 resumes generating repeating pulses *c* causing converter 12 to scan frequencies $f_1$, and $f_2$.

Also connected to output terminal 96 of control signal generator 70 is gate circuit 78. Gate circuit 78 includes a diode 111 serially connected between the output terminal 16 of limiter-discriminator 42 and the input terminal of audio amplifier 22. Connected to the cathode 113 of diode 111 is a load resistor 116 which has its opposite terminal connected to the output terminal 96 of control signal generator 70 whereby wave form A is also applied to gate circuit 78. In operation, when no signal is being received in converter 12 and, correspondingly, the output signal *a* appears at terminal 96, this signal *a* is applied to the cathode 113 of diode 111 reverse biasing same. Reverse biased diode 111 effectively blocks any signal, typically noise, being generated in limiter-discriminator circuit 42 from reaching audio amplifier 22. Conversely, when a signal is received by converter 12, wave form A shifts to the low voltage level *b*. The low voltage *b* forward biases diode 111 thereby permitting the received signal to pass from the limiter-discriminator circuit 42 into audio amplifier 22 where it is amplified and reproduced by speaker 24. This switching action is shown as wave form E with the shaded areas corresponding to a forward biased or conductive condition of diode 111.

Thus, it can be seen that control signal generator 70 generates one of two output voltage levels *a* or *b* in response to the reception or non-reception of a signal by converter 12. In the absence of such a signal, control signal *a* is applied to gate circuit 78 to block any signal or noise from passing from limiter-discriminator circuit 42 to the audio amplifier 22. The same signal *a* functions to energize scanning-signal generator 76 whereby scanning-signal generator generates a series of repeating pulses *c* causing converter 12 to scan. Conversely, upon reception of a signal by converter 12, signal *b* is generated by control signal generator 70, causing converter 12 to cease scanning and lock onto a particular one of the channels. Simultaneously, signal *b* renders gate circuit 78 conductive thereby passing the demodulated signal from limiter-discriminator 42 to audio amplifier 22.

The output terminal 96 of control signal generator 70 is also connected to the input circuit 52 of mixer 54. Mixer circuit 54 includes a mixer transistor 120 which has its base connected to the antenna 50 and also to control signal generator output terminal 96. Thus in the absence of a received signal in converter 12, high level signal *a* is applied to the base of mixer transistor 120. This high level voltage *a* forward biases transistor 120 rendering it conductive and allowing a signal being received by antenna 50 to pass into the converter circuit 14 to be therein demodulated. Upon the reception of a signal in converter 12, the output voltage of control signal generator 70 again changes to its low level *b* and low level signal *b* is applied to the base of transistor 120 rendering it non-conductive. This effectively turns "off" or disables the input circuit of the mixer 54 whereby the signal being received at antenna 50 is unable to pass into the mixer circuit to be demodulated. Thus, when no signal is being received in converter 12, converter 14, which is tuned to a different and continuously occurring radio frequency signal, is energized and operates to demodulate the received signal. Upon reception of a signal in converter 12, the input circuit of converter 14 is disabled by the low level signal *b* whereby the signal being received by antenna 50 is blocked from passing through converter 14 and into audio amplifier 22. This operation is shown in chart F of FIG. 3, the shaded areas again corresponding to a conductive state of transistor 120.

Thus, at any one time, only one demodulated signal is applied to the input terminal 20 of audio amplifier 22.

Figure 3:
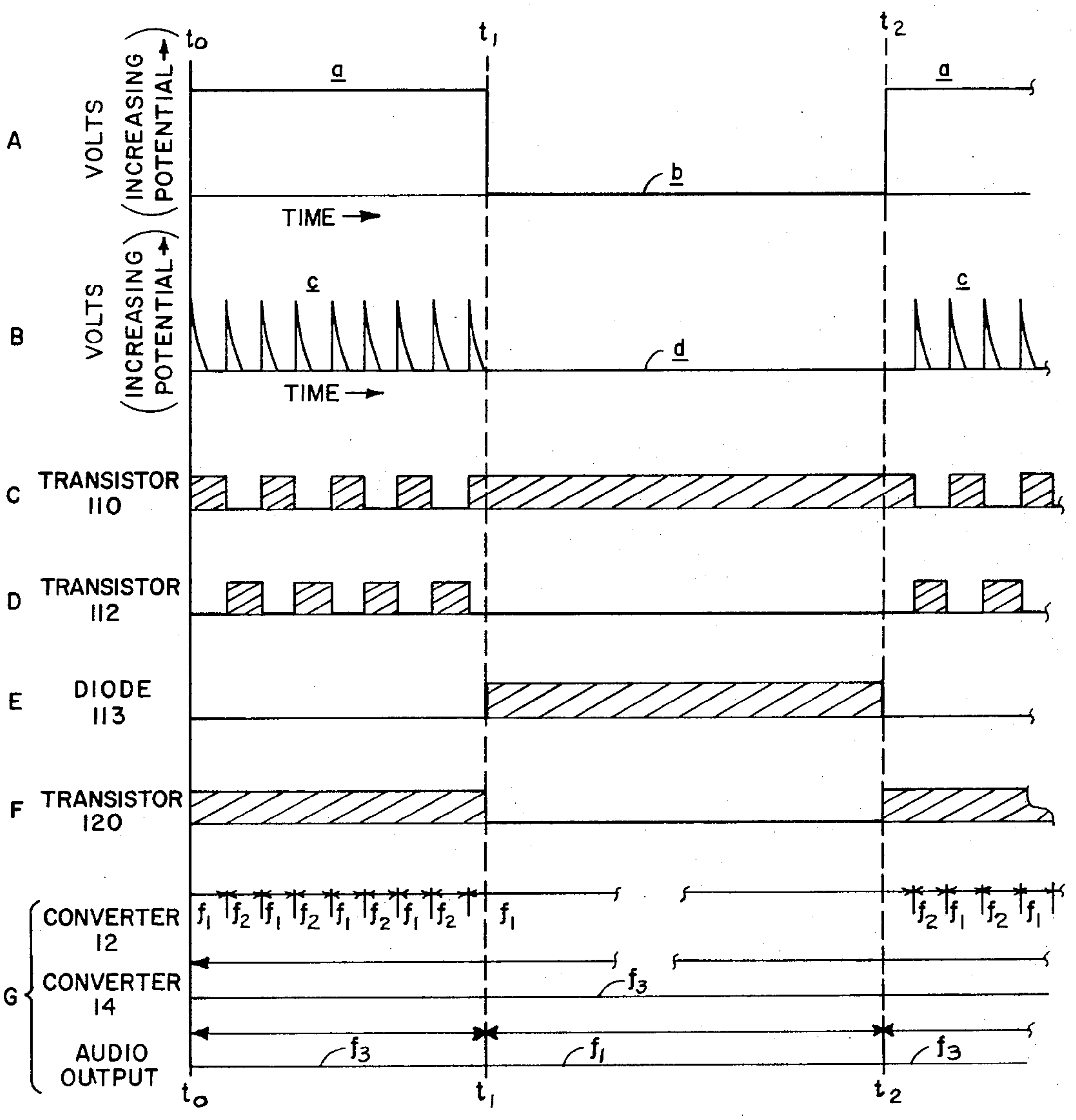
FIG. 3 is a diagram showing wave forms and charts helpful in explaining the operation of the invention.

Referring to FIG. 3 the time sequences of operation of converters 12 and 14 and the output signal from audio amplifier 22 are shown in chart G. Between times $t_0$ and $t_1$, no signal $f_1$ or $f_2$ is received by converter 12 and the scanning circuitry causes it to automatically scan frequencies $f_1$ and $f_2$. Simultaneously, converter 14 receives signal $f_3$. The signal from audio amplifier 22 during this period of time will be the demodulated signal $f_3$ received by converter 14. Conversely, when a signal, for example $f_1$, is received by converter 12, this signal $f_1$ is applied to audio amplifier 22 as indicated at time $t_1$ in chart G. Upon termination of signal $f_1$, as occurs at time $t_2$, converter 12 will resume scanning and the signal applied to audio amplifier 22 will again be signal $f_3$ from converter 14. By reason of this circuitry, the receiver will automatically select either the signal being received by converter 14 or a signal being received by converter 12. However, both converter 12 and converter 14 are simultaneously conditioned to receive one of the discrete, intermittently occurring radio frequency signals and a continuously occurring radio frequency signal, respectively.

To provide a means for manually adapting the receiver to receive signals by means of either converter 12 or converter 14 only, there is provided a manually operable mode switch 130 having two sections 132, 134. Mode switch 130 has three positions denoted as "BC" for broadcast, "Auto" for automatic, and "FM" for the frequency modulated signals as shown. Section 132 has its "BC" and "Auto" terminals connected to the B− supply and switch section 134 has the "Auto" and "FM" terminals connected thereto. The armature 136 of switch section 132 is connected to a negative bus 139 which couples each of the active stages of converter 14 to the B− supply. Similarly, armature 138 of switch section 134 is connected to a bus 140 which couples each of the active stages of converter 12 to the B− supply. Further, bus 140 also couples the scanning-signal generator 76 to the B− supply. When sections 132, 134 are in the "Auto" position (as shown), both converters 12 and 14 are seen to have their active stages connected to the B− supply. Conversely, when sections 132, 134 are in the "BC" position, only converter 14 has its active elements connected to the B− supply while the active elements of converter 12 have their connection thereto broken by reason of the open "BC" terminal of section 134. Similarly, when sections 132, 134 are in the "FM" position, the connection between the active stages of converter 14 to the B− supply is broken by reason of the open "FM" terminal of section 132 while the active stages of the "FM" converter 12 remain connected to the B− supply via armature 138 and the "FM" terminal of section 134. Thus, when switch 130 has its sections 132, 134 switched into the "BC" position, only converter 14 is energized. Simultaneously, converter 14, scanning-signal generator 76, and switch circuit 48 are deactivated. Conversely, when switch 130 has its sections 132, 134 switched into the "FM" position, the broadcast converter 14 is deactivated and only the "FM" converter 12 is energized. In this condition, scanning-signal generator 76 continues to operate as described above causing converter 12 to be sequentially tuned or conditioned to receive predetermined ones of the discrete frequencies automatically in sequence. Upon reception of a signal, the scanning of the converter 12 will terminate as described above, locking the receiver in condition to demodulate the received signal for the duration thereof.

Also connected in series with switching transistors 110, 112 of switching circuit 48 are a pair of light emitting diodes (LED) 144, 146, cathodes of LED's 144, 146 being connected to armatures 150, 152 of a three position channel-selecting switch 154. Channel-selecting switch 154 further includes two sets of three terminals, labeled A, Scan, and B as shown. The A and Scan terminals associated with armature 150 and the Scan and B terminals associated with armature 152 are all connected to the output terminal 96 of control signal generator 70. When armatures 150, and 152 are in contact with the Scan terminals, the circuit through both switching transistors 110, 112, and the respective LED's 144, 146 are complete. Thus, as each of the transistors 110, 112 is rendered conductive, the corresponding LED 144 or 146 is illuminated thereby indicating the channel to which the converter 12 is tuned. Switching circuit 48 also includes a resistor 160 which is connected between the emitters of switching transistors 110, 112 to provide a DC path for the one of transistors 110 or 112 which is "off," thereby stabilizing the circuit 48 and facilitating switching or toggling thereof.

When armatures 150 and 152 are switched into the A position, the collector-emitter circuit of transistor 112 is open circuited whereby transistor 110 is turned on and the frequency-determining element 44 is energized. Similarly, when armatures 150, 152 are moved into the B position, the collector-emitter circuit of transistor 110 is open circuited preventing energization of frequency-determining element 44 whereby transistor 112 is turned on and frequency-determining element 46 is energized. Thus, three position switch 154 provides a convenient means for conditioning the converter 12 to receive only a selected one of the discrete radio frequency signals.

Figure 4:
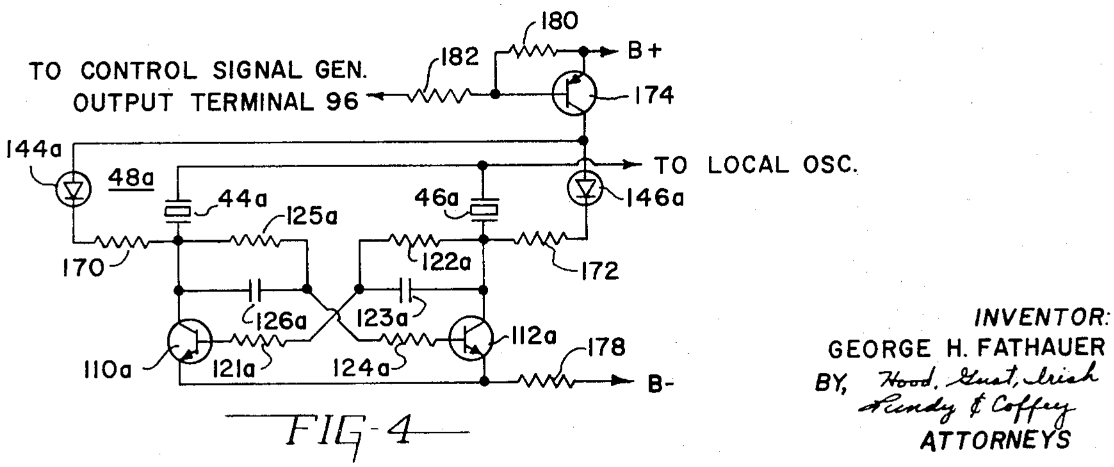
FIG. 4 is a schematic diagram of a second embodiment of a portion of the receiver.

Referring now to FIG. 4, there is illustrated an alternative circuit 48*a* for the switching circuit 48. This circuit includes switching transistors 110*a*, 112*a* which are connected together in a bistable flip-flop circuit, wherein the base of transistor 110a is coupled to the collector of transistor 112*a* by serially connected resistors 121*a*, 122*a* and shunting capacitor 123*a* and the base of transistor 112*a* is similarly coupled to the collector of transistor 110*a* by resistors 124*a*, 125*a*, and capacitor 126*a*. A load resistor 178 couples the emitter of transistors 110*a*, 112*a* to B− supply. Connected to the collector of transistor 110*a* is crystal 44*a* and connected to the collector of transistor 112*a* is crystal 46*a* both crystals 44*a* and 46*a* being connected to the local oscillator 34. Connected in parallel with crystals 44*a*, 46*a* are light-emitting diodes 144*a* and 146*a*, respectively, there being provided appropriate load resistors 170, 172 in series of each of the LED's. The anodes of the LED's 144*a*, 146*a* are connected in common to the collector of transistor 174 which in turn has its emitter connected to the B+ supply and its base connected to the output terminal 96 of control signal generator 70. Biasing resistors 180, 182 bias transistor 174 normally "on" when signal *b* is applied to the base thereof. As above, transistors 110*a*, 112*a* are alternately rendered conductive and non-conductive to automatically, sequentially energize crystals 44*a* and 46*a*. When transistor 110*a* is rendered conductive, LED 144*a* is illuminated by reason of the current passing therethrough through transistor 110*a* and similarly, when transistor 112*a* is rendered conductive, LED 146*a* is illuminated. However, with this circuit there is no current passed through the respective one of LED's 144*a*, 146*a* which is connected to the non-conducting one of transistors 110*a*, 112*a*, therefore the LED connected in parallel with the deactivated one of crystals 44*a*, 46*a* is totally extinguished. Further, the current to both LED 144*a* and 146*a* is blocked by transistor 174 by reason of transistor 174 being rendered non-conductive in response to the high level signal *a* from control signal generator 70. Thus both LED 144*a* and 146*a* are extinguished when the receiver is scanning and only the appropriate one thereof is illuminated upon reception of a signal on the corresponding channel and application of low level signal *b* to the base of transistor 174. The circuit of FIG. 1 has the advantage of utilizing fewer parts while the circuit of FIG. 4 provides a more positive indication of the channel to which the receiver is tuned.

Figure 2:
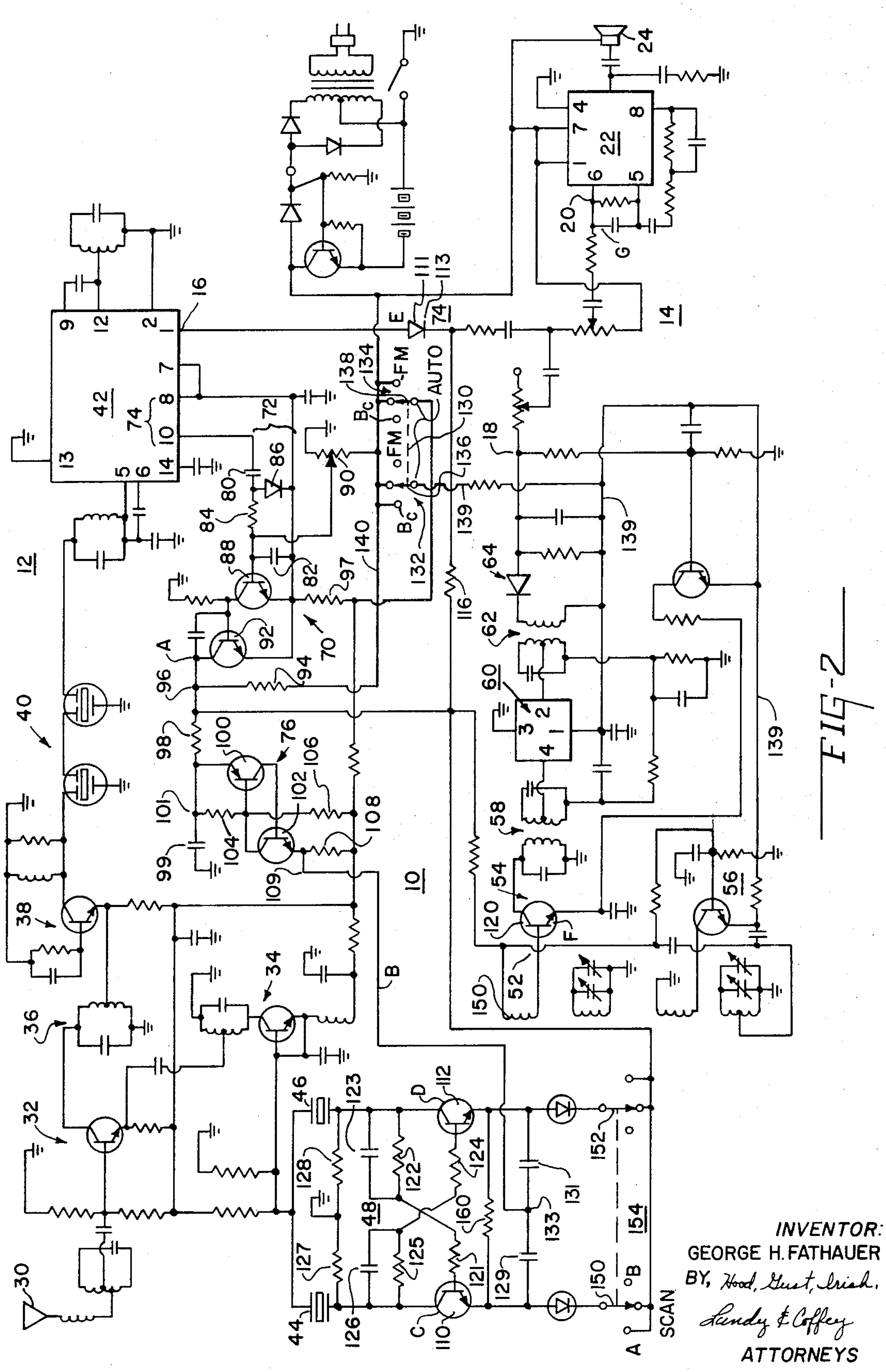
FIG. 2 is a schematic diagram of the complete receiver.

In FIG. 2 there is illustrated a detailed schematic of a working embodiment of the invention. While the various components and values thereof may vary without departing from the scope of this invention, various components are identified specifically in the following with respect to the working embodiment illustrated.

| | | |
|---|---|---|
| Limiter-discriminator 42 | | Sprague type ULN-2111A |
| IF Amplifier 38 | | MFC 6010 |
| Audio Amplifier 22 | | SGS 6111B |
| Diode 86 | | 1N48 |
| Diode 111 | | 1N914 |
| Resistors: | 84 | 4.7 K |
| | 94 | 2.7 K |
| | 97 | 15 |
| | 98 | 2.2 Meg |
| | 104 | 10 K |
| | 106 | 10 K |
| | 108 | 100 |
| | 116 | 100 K |
| | 121 | 2.2 K |
| | 122 | 10 K |
| | 124 | 2.2 K |
| | 125 | 10 K |
| | 127 | 330 |
| | 128 | 330 |
| | 160 | 1 K |
| | 121*a* | 2.2 K |
| | 122*a* | 10 K |
| | 124*a* | 212 K |
| | 125*a* | 10 K |
| | 170 | 330 |
| | 172 | 330 |
| | 178 | 100 |
| | 180 | 4.7 K |
| | 182 | 15 K |
| Squelch Control 90 | | 25 K |
| Capacitors: | 80 | .001 mfd. |
| | 82 | .01 mfd. |
| | 99 | .1 mfd. |
| | 123 | .001 mfd. |
| | 126 | .001 mfd. |
| | 123*a* | .001 mfd. |
| | 126*a* | .001 mfd. |
| LED 144, 146 | | FLV 102 |

In the illustrated receiver, the converter 12 is adapted to operate in the VHF/UHF spectrum while the broadcast converter 14 is adapted to operate in the normal broadcast band. It will of course be obvious that the broadcast converter 14 could also be an FM converter without departing from the spirit of the invention.

While there have been described above the principles of this invention in connection with specific apparatus, it is to be clearly understood that this description is made only by way of example and not as a limitation to the scope of the invention.

What is claimed is:

1. For use in a radio receiver for automatically, selectively tuning to individual ones of a plurality of predetermined, intermittently occurring radio frequency signals and, simultaneously therewith, tuning to a continuously occurring radio frequency signal at a frequency different from said intermittently occurring signals, the combination comprising, a. first converter means continuously tunable over a predetermined frequency band for demodulating a selected, continuous radio frequency signal, b. second converter means for automatically, sequentially conditioning said receiver to demodulate individual ones of a plurality of discrete, intermittently occurring radio frequency signals, c. means for generating a first control signal is response to reception of one of said discrete radio frequency signals and generating a second control signal in response to the absence thereof, d. said first converter means having an input circuit which includes means coupled to said control signal generating means for disabling said first converter means in response to said first control signal, and an output circuit, e. said second converter means including, 1. switched local oscillator means coupled to said control signal generating means for automatically, sequentially generating a plurality of local oscillator signals in response to said second control signal and generating continuously one of said local oscillator signals in response to said first control signal to thereby condition said second converter to demodulate said one of said discrete radio frequency signals for the duration of said one of said radio frequency signals, and 2. an output circuit which includes means coupled to said control signal generating means for disabling said output circuit in response to said second control signal f. an audio amplifier which includes an input circuit coupled to said first and said second converter output circuits.

2. The combination of claim 1 wherein said switched local oscillator means includes a plurality of frequency-determining means for determining the frequency of said local oscillator signals, means for generating a plurality of switching-signals in periodic sequence, and switch means coupled to said switching-signal generating means for activating individual ones of said frequency-determining means in response to predetermined ones of said switching signals.

3. The combination of claim 2 wherein said switch means includes a plurality of switch-circuits coupled individually to predetermined ones of said frequency-determining means, said switch-circuits being individually responsive to predetermined ones of said switching-signals.

4. The combination of claim 3 wherein said switch-circuits include a switching transistor, said transistor having the emitter thereof connected to said switching-signal generating means and being biased alternately between conductive and non-conductive states in response to said switching-signals.

5. The combination of claim 4 wherein there are two of said frequency-determining means and two of said switching transistors, each of said switching transistors having its base coupled to the collector of the other switching transistor, each said frequency-determining means being connected electrically in series with the collector of a different one of said switching transistors.

6. The combination of claim 5 wherein said switching transistors are connected together to form a bistable flip-flop circuit.

7. The combination of claim 6 wherein said frequency determining means are crystals.

8. The combination of claim 2 wherein said control signal generating means includes a first control transistor, said first control transistor having the base thereof coupled to the output circuit of said second converter means, said first control transistor being rendered alternately conductive and non-conductive in response to reception and non-reception of one of said discrete radio frequency signals, respectively.

9. The combination of claim 8 wherein said control signal generating means includes a first resistor connected in shunt with said control transistor, and a second resistor and a charging capacitor connected electrically in series with a collector and emitter of said control transistor, whereby said charging capacitor has a charge applied thereto when said control transistor is rendered non-conductive.

10. The combination of claim 9 wherein said switching signal generating means includes oscillator means for generating repetitively occurring output signals in periodic sequence, said output signals being said switching signals.

11. The combination of claim 10 wherein said oscillator means includes at least one oscillator transistor, said oscillator transistor having its collector and emitter connected electrically in series with said charging capacitor, said oscillator transistor being rendered conductive and non-conductive in response to the charge on said charging capacitor, whereby said oscillator transistor discharges said charging capacitor when said charge reaches a predetermined voltage.

12. The combination of claim 11 wherein said oscillator means includes a second oscillator transistor having its base connected to the collector circuit of said first mentioned oscillator transistor, said second oscillator transistor being rendered conductive and non-conductive in correspondence with said first mentioned oscillator transistor.

13. The combination of claim 9 wherein said control signal generating means further includes a second control transistor, said second control transistor having its base connected to said second converter means, said first control transistor having its base connected to the collector-emitter circuit of said second control transistor.

14. The combination of claim 2 further comprising means for manually disabling predetermined ones of said switch-circuits, thereby disabling said receiver from tuning to receive predetermined ones of said intermittent radio frequency signals.

15. The combination of claim 14 wherein said manual means includes a multiple pole channel-selecting switch having individual ones of the poles thereof connected electrically in series with a predetermined one of said switching transistors.

16. The combination of claim 15 further comprising a plurality of visual indicating means connected electrically in series to predetermined ones of said switching transistors.

17. The combination of claim 16 wherein said visual indicating means are connected electrically in series with individual ones of the poles of said channel-selecting switch and electrically in parallel with predetermined ones of said switching transistors.

18. The combination of claim 16 wherein said visual indicating means are connected electrically in series with individual ones of the poles of said channel-selecting switch and electrically in series with predetermined ones of said switching transistors.

19. The combination of claim 1 further comprising manually operable means for individually, selectively disabling said first and said second converter means.

20. The combination of claim 19 wherein said manually operable disabling means includes a mode switch having first, second, and third positions, said mode switch coupling said first converter means to a source of operating potential and disconnecting said second converter means therefrom when in said first position, connecting both said first and said second converter means to said source when in said second position, and connecting said second converter means and disconnecting said first converter means from said source when in said third position.

21. For use in a radio receiver for tuning to a continuously occurring radio frequency signal and to individual ones of a plurality of predetermined, intermittently occurring radio frequency signals automatically in sequence, the combination comprising, a. first converter means continuously tunable over a predetermined frequency band for conditioning the receiver to demodulate a selected, continuous radio frequency signal, b. second converter means for automatically, sequentially conditioning said receiver to demodulate individual ones of a plurality of discrete, intermittently occurring radio frequency signals, c. means for generating a first control signal in response to reception of one of said discrete radio frequency signals and generating a second control signal in response to the absence thereof, d. said first converter means having an input circuit and an output circuit, said input circuit being coupled to said control signal generating means and including circuit means for disabling said first converter means in response to said first control signal, e. said second converter means having an input circuit and an output circuit and including means for locking said second converter in condition to demodulate said one of said discrete radio frequency signals, f. a gating circuit connected to the output circuit of said second converter means and also to said control signal generating means, and g. an audio amplifier having an input circuit coupled to said gating circuit and to said output circuit of said first converter means, said gating circuit being responsive to said first and second control signals for alternatively coupling and decoupling, respectively, said second converter output circuit to said audio amplifier.

22. The combination of claim 21 wherein said gating circuit includes a diode connected electrically in series between said second converter output circuit and said audio amplifier input circuit.

23. The combination of claim 22 wherein said diode has its cathode connected to said control signal generating means, said diode being rendered conductive in response to said first control signal and non-conductive in response to said second control signal.

24. The combination of claim 21 wherein said first converter circuit disabling means includes a mixer transistor having the base thereof coupled to said control signal generating means, said mixer transistor being rendered conductive in response to said second control signal and non-conductive in response to said first control signal.

25. The combination of claim 24 wherein said first converter means further includes an antenna circuit having an output terminal, said output terminal being connected to the base of said mixer transistor.

26. The combination of claim 21 wherein said second converter means includes local oscillator means for generating a plurality of local oscillator signals, said local oscillator means including a plurality of switching crystals, a plurality of transistors coupled individually to predetermined ones of said crystals, and means responsive to said second control signal for generating a plurality of periodically occurring switching signals, said switching transistors being coupled to said switching signal generating means and being individually, sequentially responsive to said switching signals to activate respective ones of said crystals.

27. The combination of claim 26 further comprising a plurality of visual switching means for indicating the conductive state of said switching transistors, said visual indicating means being individually coupled to predetermined ones of said switching transistors.

28. The combination of claim 27 wherein said visual indicating means are connected electrically in series with the collector-emitter circuit of said switching transistors, and electrically in parallel with said frequency determining means.

29. The combination of claim 28 wherein said visual indicating means are connected electrically in series with a collector-emitter circuit of said switching transistors and said frequency determining means.

30. The combination of claim 27 wherein said visual indicating means are light emitting diodes.

* * * * *

UNITED STATES PATENT OFFICE

CERTIFICATE OF CORRECTION

Patent No. 3,725,788 Dated April 3, 1973

Inventor(s) George H. Fathauer

It is certified that error appears in the above-identified patent and that said Letters Patent are hereby corrected as shown below:

IN THE CLAIMS

Claim 1, Column 10, line 29, change "is" to --- in ---;
Claim 26, Column 14, line 4, delete "switching";
Claim 26, Column 14, line 5, before "transistors" insert --- switching ---;
Claim 27, Column 14, line 14, change "switching" to --- indicating ---;
Claim 14, Column 12, line 1, change "2" to --- 4 ---;

Claim 28, Column 14, last line, change "frequency determining means" to --- crystals, respectively ---;
Claim 29, Column 14, first line, change "28" to --- 27 ---;
Claim 29, Column 14, last line, change "frequency determining means" to --- crystals, respectively ---.

Signed and sealed this 20th day of November 1973.

(SEAL)
Attest:

EDWARD M.FLETCHER,JR.
Attesting Officer

RENE D. TEGTMEYER
Acting Commissioner of Patents